US008991730B2

(12) United States Patent
Kah, Jr. et al.

(10) Patent No.: US 8,991,730 B2
(45) Date of Patent: Mar. 31, 2015

(54) PRESSURE REGULATING NOZZLE ASSEMBLY WITH FLOW CONTROL RING

(76) Inventors: Carl L. C. Kah, Jr., North Palm Beach, FL (US); Carl L. C. Kah, III, North Palm Beach, FL (US); Weiming Feng, West Palm Beach, FL (US)

( * ) Notice: Subject to any disclaimer, the term of this patent is extended or adjusted under 35 U.S.C. 154(b) by 480 days.

(21) Appl. No.: 13/329,071

(22) Filed: Dec. 16, 2011

(65) Prior Publication Data

US 2012/0153051 A1 Jun. 21, 2012

Related U.S. Application Data

(60) Provisional application No. 61/423,904, filed on Dec. 16, 2010.

(51) Int. Cl.

| | |
|---|---|
| ***B05B 1/30*** | (2006.01) |
| ***B05B 3/02*** | (2006.01) |
| ***B05B 3/04*** | (2006.01) |
| ***B05B 15/10*** | (2006.01) |
| ***F16K 31/122*** | (2006.01) |
| ***B05B 1/26*** | (2006.01) |
| ***B05B 1/32*** | (2006.01) |

(52) U.S. Cl.
CPC ................. *B05B 15/10* (2013.01); *B05B 1/265* (2013.01); *B05B 1/3006* (2013.01); *B05B 1/323* (2013.01)
USPC ........ 239/581.1; 239/203; 239/204; 239/206; 239/222.11; 239/222.17; 137/505

(58) Field of Classification Search
CPC ...... B05B 1/30; B05B 1/3006; B05B 1/3026; B05B 1/323; B05B 1/326; B05B 3/0486; B05B 15/10
USPC .................... 239/200, 201, 203–206, 222.11, 239/222.17, 222.19, 231, 533.1, 581.1, 239/581.2, 582.1, DIG. 1; 137/504, 505, 137/505.13–505.15
See application file for complete search history.

(56) References Cited

U.S. PATENT DOCUMENTS

| | | | | |
|---|---|---|---|---|
| 4,681,259 | A | 7/1987 | Troup et al. | |
| 5,647,541 | A * | 7/1997 | Nelson | 239/590.5 |
| 5,762,270 | A * | 6/1998 | Kearby et al. | 239/205 |
| 5,779,148 | A * | 7/1998 | Saarem et al. | 239/104 |
| 2003/0075620 | A1* | 4/2003 | Kah, Jr. | 239/553 |
| 2003/0098365 | A1* | 5/2003 | Lockwood | 239/203 |
| 2006/0278727 | A1* | 12/2006 | Kah, Jr. | 239/67 |
| 2007/0028966 | A1 | 2/2007 | Feith | |
| 2008/0257982 | A1 | 10/2008 | Kah et al. | |
| 2008/0272203 | A1 | 11/2008 | Leber | |
| 2010/0147401 | A1 | 6/2010 | Gregory | |
| 2011/0024523 | A1* | 2/2011 | Sesser et al. | 239/205 |

OTHER PUBLICATIONS

International Search Report and Written Opinion dated May 8, 2012 corresponding to PCT Patent Application No. PCT/US 11/65622.

* cited by examiner

*Primary Examiner* — Darren W Gorman
(74) *Attorney, Agent, or Firm* — Ostrolenk Faber LLP

(57) ABSTRACT

An irrigation sprinkler and sprinkler nozzle assembly including a self contained pressure regulator and flow control ring, which can be assembled with a desired spray deflector, shrub bubbler or rotating stream distributor on the top of the nozzle assembly. The pressure regulator housing is incorporated into the center of the nozzle assembly and includes a reference pressure chamber connected to atmospheric pressure with a spring bias enclosed to bias a pressure responsive movable member that is connected to an upstream pressure balanced flow throttling valve. A combination deflector pop-up pressure regulating mechanism housed in the filter of the nozzle housing assembly is also shown.

24 Claims, 23 Drawing Sheets

PRESSURE REGULATING NOZZLE ASSEMBLY WITH FLOW CONTROL RING

CROSS-REFERENCE TO RELATED APPLICATIONS

The present application claims benefit of and priority to U.S. Provisional Patent Application No. 61/423,904 entitled PRESSURE REGULATING NOZZLE ASSEMBLY WITH FLOW CONTROL RING filed Dec. 16, 2010, the entire content of which is hereby incorporate by reference herein.

BACKGROUND

1. Field of the Disclosure

The present disclosure relates to a sprinkler including both pressure regulation and flow throttling provided in the nozzle assembly.

2. Related Art

Several major irrigation equipment manufacturers manufacture sprinklers which have pressure regulators incorporated into the sprinkler riser to which a nozzle assembly is attached. See, for example, U.S. Pat. No. 5,779,148. The pressure regulator may provide a relatively constant pressure to the attached nozzle assembly over a relatively wide range of flow rates and upstream nozzle assembly pressures for ¼, ½ or full circle nozzles.

Pressure compensating insertable elastomeric washers are manufactured to provide some pressure compensation with a different color code designating different nozzle flow rates. These washers, however, have limited flow and pressure ranges as provided by the deflection of an elastomeric disc with a sharp edge hole in the center which when the upstream pressure is high bend the elastomeric flow limiting disc with sharp edge hole and reduce the diameter of the upstream sharp edge. These pressure compensating washers may be incorporated into the nozzle assemblies or filter assemblies of existing sprinklers. As many as 12 or more may be necessary depending on the manufacturer to cover a range of flows for ¼, ½ and full circle sprinklers.

Co-pending U.S. patent application Ser. No. 12/348,864 filed Jan. 5, 2009 entitled ARC AND RANGE OF COVERAGE ADJUSTABLE STREAM ROTOR SPRINKLER and Ser. No. 11/438,796 entitled PRESSURE REGULATING NOZZLE ASSEMBLY filed May 22, 2006 discuss additional background information and are hereby incorporated by reference herein in their entirety.

SUMMARY

The present disclosure relates to a compact, simple pressure regulating valve which may be compactly incorporated into a nozzle assembly itself so that nozzle pressure to its outlet orifice is fully controlled over a wide range of inlet pressures and nozzle flow rates for different nozzle types and flow rates and is referenced to atmospheric pressure for accuracy. One configuration of parts may be assembled with many different nozzle assembly output configurations.

A nozzle assembly according to an embodiment of the present application includes a self-contained pressure regulator adapted for connection to an existing water supply or sprinkler. The pressure regulator preferably includes a moveable pressure responsive member, a reference pressure area, a bias spring acting in opposition to water pressure against the pressure responsive member, a flow throttling member connected to the pressure responsive member to throttle the nozzle flow in accordance with the movement of the pressure responsive member to maintain a desired pressure for the nozzle water directing elements to function repeatedly under varying inlet pressure conditions.

The reference pressure area is preferably referenced to atmospheric pressure.

The pressure responsive member may be exposed to sense pressure in the nozzle housing at the nozzle housing outlet for water flow through the nozzle assembly to striking the spray deflector or rotating distributor of the nozzle assembly.

The nozzle assembly may also include a manually adjustable flow control valve where the pressure responsive member senses pressure at the inlet to the manually controlled flow throttling member which is upstream of the nozzle housing outlet for flow to strike the spray deflector or rotating distributor.

The pressure responsive member may be configured to sense pressure inside the filter prior to entering the nozzle housing assembly.

In the preferred configurations, the pressure regulation components are on the center axis line of the nozzle assembly housing.

The pressure responsive member may also actuate a pop-up deflector out of a protective position in the nozzle housing before its axial movement encounters a second bias spring for establishing the control pressure to the nozzle assembly.

A nozzle assembly in accordance with an embodiment of the present disclosure includes a lower housing configured for attachment to a sprinkler assembly, an upper housing mountable on the lower housing and including an outlet nozzle, a flow control ring positioned between the lower housing and the upper housing, the flow control ring movable relative to the upper and lower housing to control a flow water through the nozzle assembly, a distributor movably mounted in the nozzle assembly and configured to deflect water from nozzle outlet out of the nozzle assembly and a pressure regulating and throttling mechanism configured to maintain a desired pressure at an inlet of the lower housing.

A nozzle assembly in accordance with an embodiment of the present disclosure includes a lower housing configured for attachment to a sprinkler assembly, an upper housing mountable on the lower housing and including an outlet nozzle, a flow control ring position between the lower housing and the upper housing, the flow control ring movable to control a flow of water through the nozzle assembly, a distributor rotatably mounted on a support shaft that is mounted in the nozzle assembly for axial movement in the nozzle assembly, the distributor configured to deflect water out of the nozzle assembly; and a pressure regulating and throttling mechanism positioned in the lower housing and configured to maintain a desired pressure in the lower housing.

A nozzle assembly in accordance with an embodiment of the present application includes a lower housing configured for attachment to a sprinkler assembly, an upper housing mountable on the lower housing and including an outlet nozzle, a flow control ring positioned between the lower housing and the upper housing, the flow control ring movable to control a flow of water through the nozzle assembly, a distributor rotatably mounted on a support shaft that is mounted in the nozzle assembly for axial movement in the nozzle assembly, the distributor configured to deflect water out of the nozzle assembly and a pressure regulating and throttling mechanism positioned in the lower housing and configured to maintain a desired pressure in the lower housing.

Other features and advantages of the present invention will become apparent from the following description of the invention, which refers to the accompanying drawings.

DETAILED DESCRIPTION OF THE EMBODIMENTS

Figure 1:
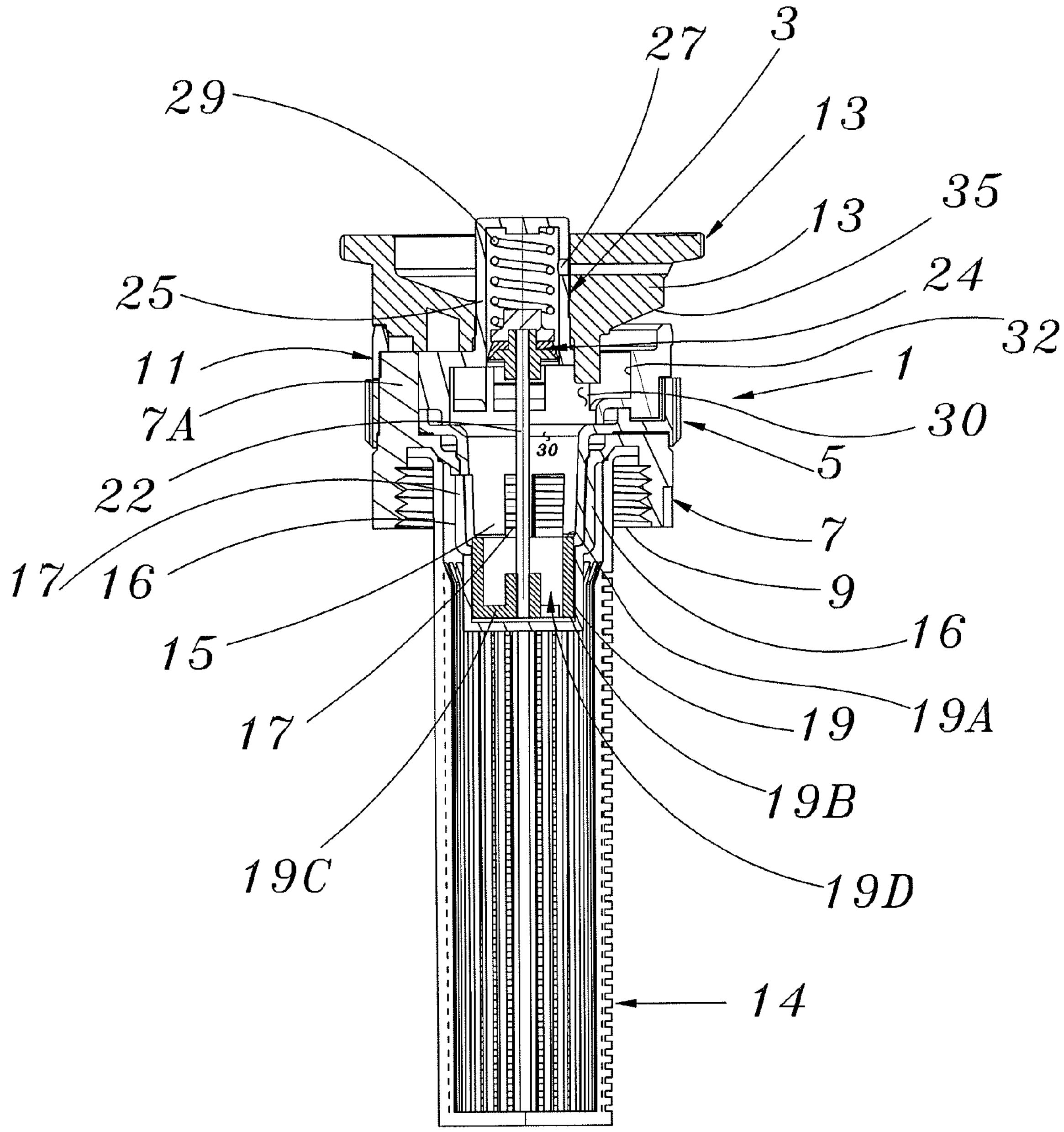
FIG. 1 is a cross sectional view of a spray nozzle assembly with integral pressure regulation and circumferential manual flow control with a fixed spray deflector assembly on top of the nozzle assembly housing.

FIG. 1 shows a cross section of a spray nozzle assembly 1 with integral pressure regulator 3 and manually operated circumferential flow control ring 5 that provides flow control for manual range adjustment of the nozzle assembly for particular installation requirements in an irrigation system.

The nozzle assembly 1 includes a lower housing 7 with an internal attachment thread 9 provided for attachment of the nozzle assembly 1 to a source of water, or irrigation sprinkler with, for example, a pop-up riser, an upper housing member 11, a nozzle housing outlet spray deflector 13 and the rotationally adjustable circumferential flow control ring 5. An attached inlet flow filter 14 is press fitted into the attachment thread 9 of the lower housing 7.

Figure 5:
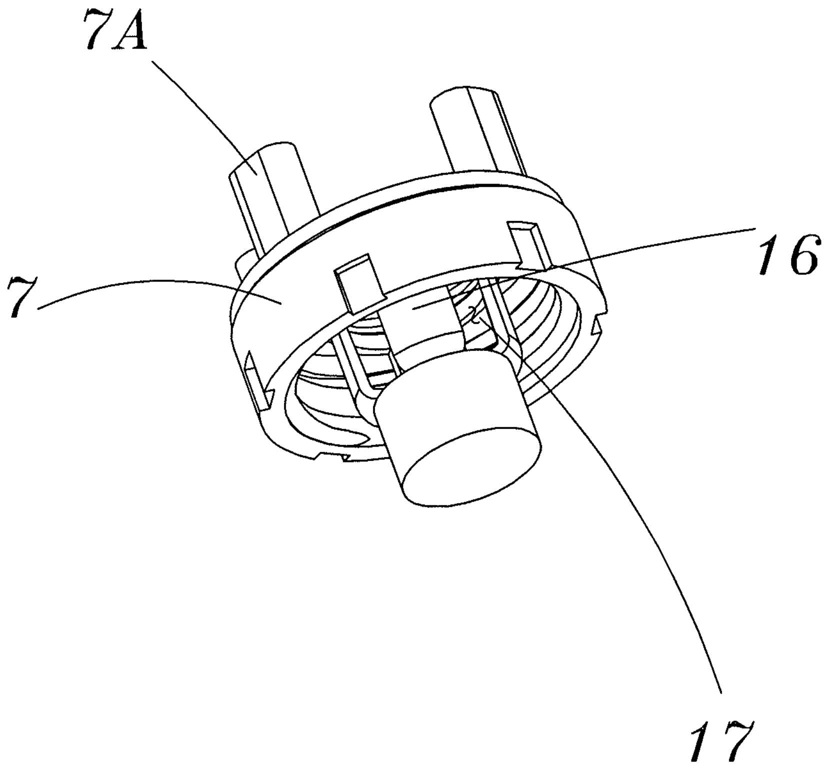
FIG. 5 is a perspective view of the nozzle assembly lower body with a female thread for attachment to a sprinkler riser and a post for attachment to an upper nozzle assembly upper body member.
Figure 6:
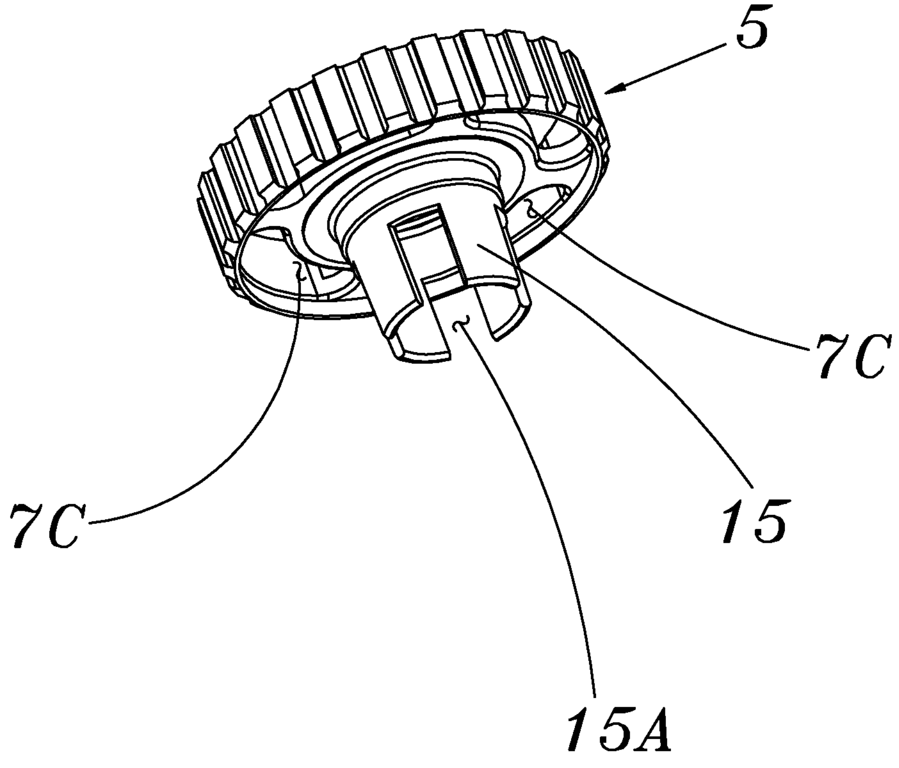
FIG. 6 is a perspective view of a manual flow control valve with its circumferential outside manual accessible adjustment ring.

Manual flow control ring 5 includes feet 15 (see FIG. 6) that protrude downward to hide behind legs 16 of the lower housing 7 (see FIG. 5) and that are rotationally movable in front of the circumferential spaced flow openings 17 of the lower nozzle housing 7 to allow manual throttling of opening 17. This allows for throttling of the flow through the nozzle assembly 1 for manual range control of the nozzle assembly's spray pattern. The lower housing 7 and the ring 5 are illustrated in further detail in FIGS. 5 and 6. FIG. 5 shows a perspective view of the lower nozzle housing 7, and in particular, the inlet area thereof. FIG. 6 shows a perspective view of the manual flow control ring 5. The ring 5 manually operated from the outside of the assembly 1 to provide flow control. The nozzle housing assembly includes the upper nozzle housing 11 attached to the lower nozzle housing 7 by elements 7A extending upward from the top of the lower housing 7 (see FIG. 5) through openings 7C around the top surface of the flow control ring 5 (see FIG. 6) and into the openings 11A of the upper nozzle housing 11 (see FIG. 7), where they can be fixed, by sonic welding, for example. This type of flow control is further described in detail in co-pending U.S. patent application Ser. No. 11/947,571 filed on Nov. 29, 2007 and published as U.S. Patent Publication No. US-2008-0257982 on Oct. 23, 2008, entitled SPRINKLER HEAD NOZZLE ASSEMBLY WITH ADJUSTABLE ARC, FLOW RATE AND STREAM ANGLE, the entire content of which is hereby incorporated by reference herein. Additional detail is also provided in the aforementioned U.S. patent application Ser. No. 12/348,864 filed Jan. 5, 2009 entitled has also been incorporated by reference herein.

Figure 12:
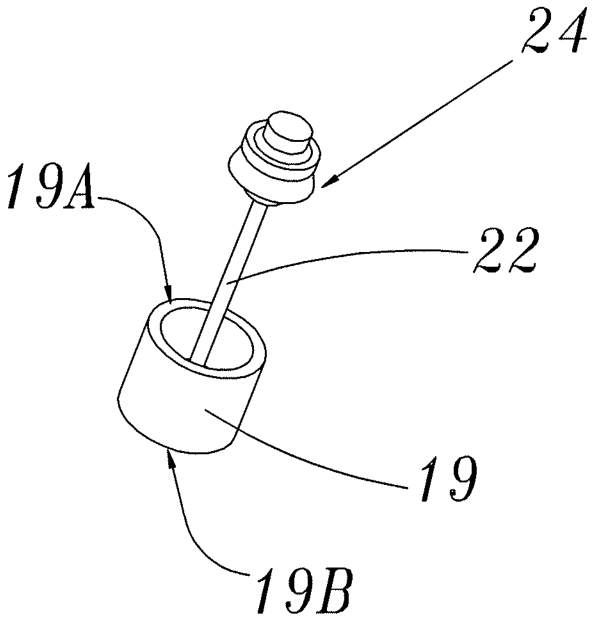
FIG. 12 is a perspective view of the pressure responsive throttling assembly.
Figure 13:
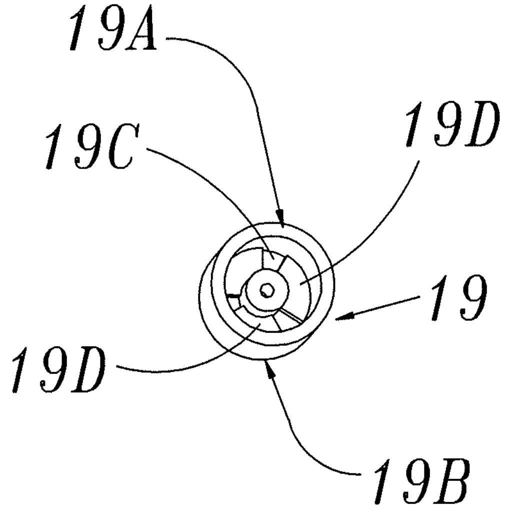
FIG. 13 is a perspective view of the pressure balance throttling valve member.

The pressure regulating throttling member 19 is illustrated in further detail in FIGS. 12 and 13. The pressure regulating throttling member 19 is attached via a center axis located connecting rod 22 to the pressure responsive piston assembly 24. The pressure regulating throttle valve member 19, shown in more detail in FIG. 13, has an outer cylindrical axial moving valving member with a to throttling valving surface 19A and a lower pressure balanced valving surface 19B. This cylindrical pressure balanced throttling valve member 19 is connected to a center hub by spokes 19C with open area 19D between the spokes to allow for pressure balancing of the lower surface 19B of throttling valving member 18. This throttling valve member 19 is attached to the pressure responsive piston assembly 24 by connecting rod 22.

Figure 7:
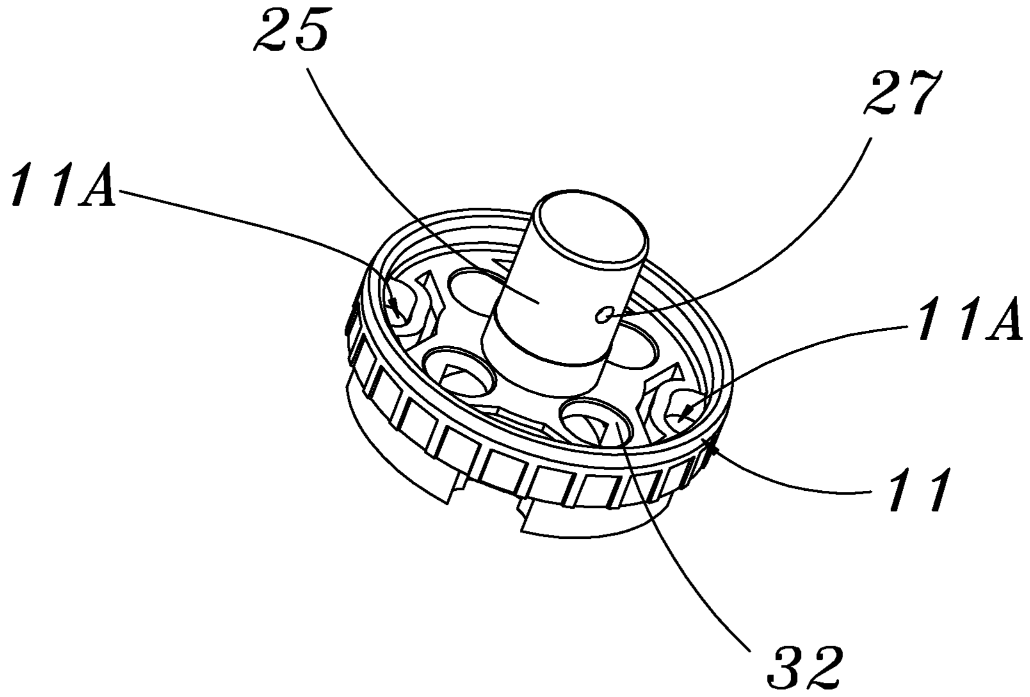
FIG. 7 is a perspective view of an upper housing member that is attached to the lower nozzle assembly housing to capture the flow control valve and provide a mounting for the desired nozzle assembly discharge pattern member.

The pressure responsive piston assembly 24 is housed in a cylindrical housing 25, which is part of the upper housing 11 shown in FIG. 7. The cylindrical housing 25 includes atmospheric pressure reference opening 27. The housing 25 also serves as the housing for the biasing spring 29 that biases the pressure responsive piston assembly downward.

As can be seen in FIG. 1, during operation, flow enters the nozzle assembly 1 through filter 14 and flows up through flow openings 17 in the lower nozzle housing 7 seen in FIG. 5 and into the internal cavity 30. From the cavity 30, water flows up through the outlet holes 32 formed in the upper nozzle housing 11. See FIG. 7. The outlet hole 32 has a lower foot of deflector element 35 (see FIG. 8) protruding down to help direct the flow into the deflector element.

Figure 8:
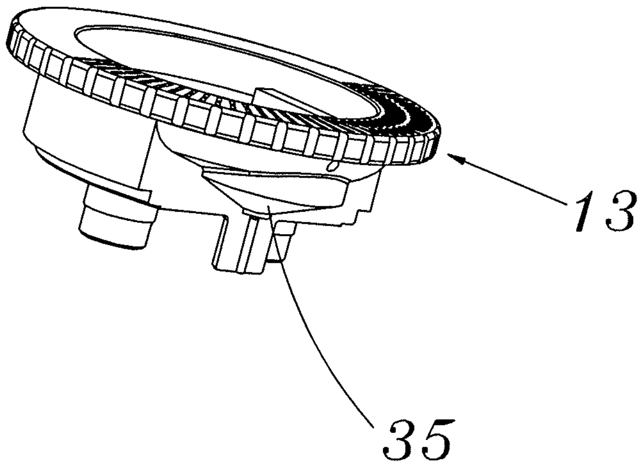
FIG. 8 is a perspective view of a fixed 90° spray arc of coverage piece for mounting on the top of the nozzle assembly.

The pressure in cavity area 30 will act on the underside of pressure responsive assembly 24 to generate a pressure area force that, if it exceeds the preloaded bias force of biasing spring 29, will force pressure responsive assembly 24 upward. This will pull connecting rod 22 up and move the pressure regulating throttling member 19 upward inside the diameter of the manual flow throttling valve member 15. The pressure regulating member 19 will then begin to close off the available flow openings 17 that provide flow into the nozzle assembly cavity 30. As a result, a desired constant operating pressure to nozzle housing outlet holes 32 is maintained. The flow through these outlet holes 32 strikes the bottom surface 35 of spray deflector 13 and generates a constant spray pattern projecting outward from this pressure regulated spray nozzle assembly 1. FIG. 8 shows a more detailed view of the deflector 13 and the deflection surface 35.

Figure 2:
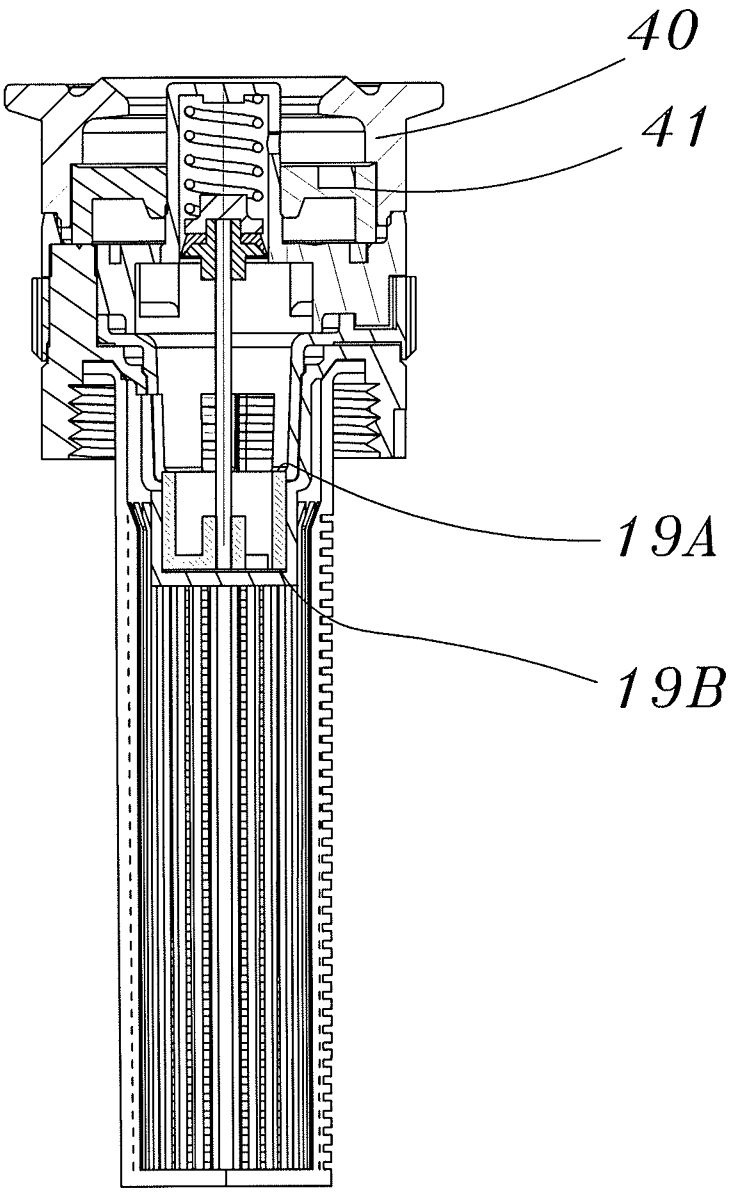
FIG. 2 illustrates the spray nozzle assembly of FIG. 1 with a full circle spray deflector assembly on top of the nozzle assembly housing.
Figure 3:
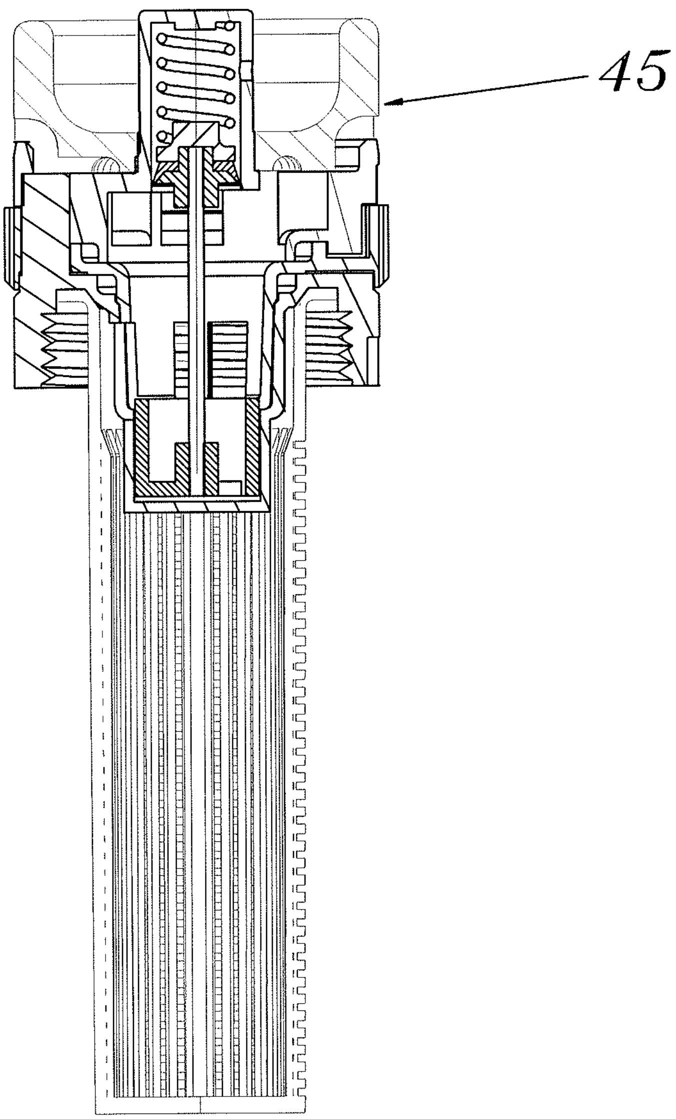
FIG. 3 illustrates the spray nozzle assembly of FIG. 1 with a full circle flow bubbler discharge nozzle assembly on top of the nozzle assembly housing.
Figure 9:
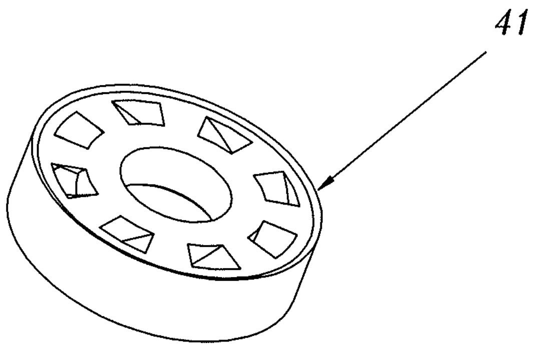
FIG. 9 is a perspective view of a full circle slot swirler element component that is incorporated into full circle discharge deflector.
Figure 10:
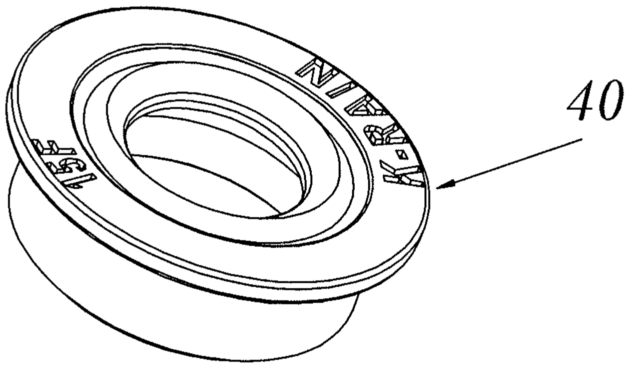
FIG. 10 is a perspective view of full circle deflector ring for attachment to the top of a full circle spray nozzle assembly with full pressure regulation and manual flow control for range.
Figure 11:
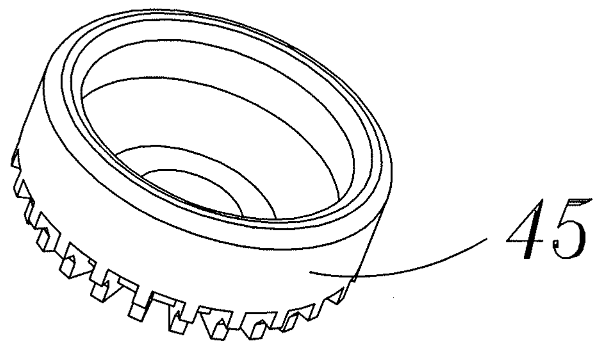
FIG. 11 is a perspective view of a bubbler top for the nozzle assembly.

If desired, a different spray pattern may be provided by incorporating a different discharge pattern piece, such as element 40 shown in FIG. 2. The element 40 provides a full circle spray pattern when used with the additional swirl plate 41, also shown in more detail in FIG. 9. Element 40 is illustrated in more detail in FIG. 10 while plate 41 is shown in further detail in FIG. 9. The elements 40, 41 may be added to the nozzle assembly 1 of FIG. 1 to replace deflector 13 which provides for ¼ and ½ circle spray patterns. As a result the same pressure regulation and with a manually adjustable flow control may be used in the embodiment of FIG. 2 as is used in the embodiment of FIG. 1.

Figure 4:
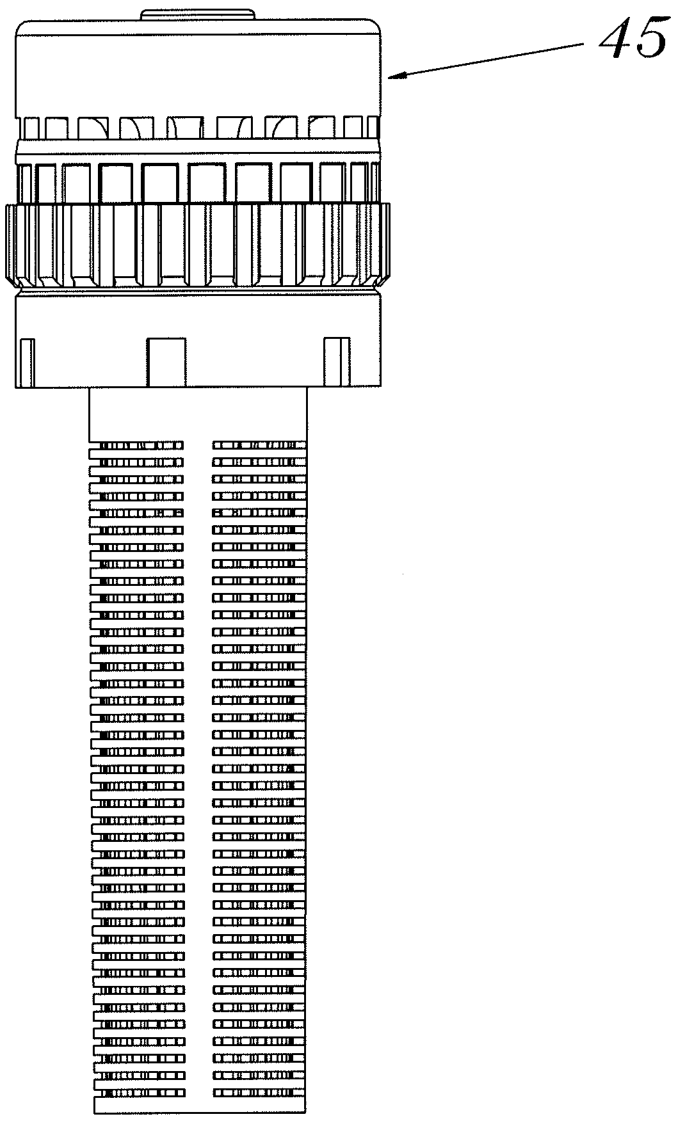
FIG. 4 shows an external view of the nozzle assembly of FIG. 3 with an inlet filter and a flow exit shrub or tree watering bubbler top.

In another embodiment, the deflector 13 may be replaced by a shrub or tree watering flow bubbler nozzle assembly top 45 as is shown in FIG. 4. The bubbler assembly top 45 may be used in conjunction with the same pressure regulating nozzle assembly 1 discussed above. FIG. 4 illustrates an external view of a nozzle assembly including the bubbler top 45 in place of the deflector 13. FIG. 5 illustrates a more detailed view of the bubbler top 45 itself.

Figure 14:
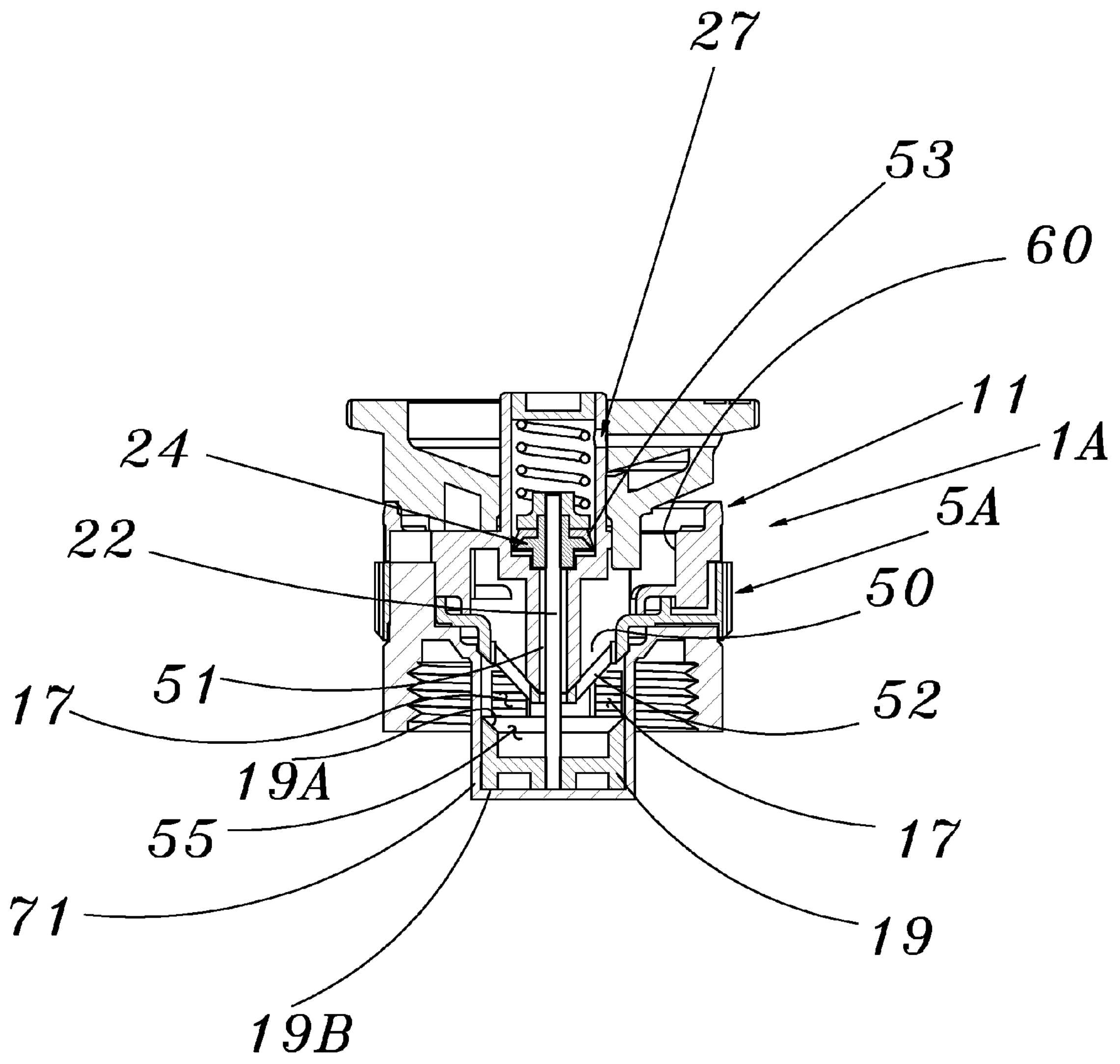
FIG. 14 is a cross sectional view of a spray nozzle assembly with integral pressure regulator and circumferential manual flow control as shown in FIG. 1, but with the control pressure sense down the center to a pressure flow control cavity up stream of the manual flow control valving members.

An alternative pressure regulating nozzle assembly 1A is shown in FIG. 14. The flow throttling openings 50 of FIG. 14 are positioned on the underside of the upper housing 11 and the manually movable throttling feet 52 of the manually adjustable circumferential flow throttling ring 5A have been angled inwardly and downwardly in a cone shape to be able to open and close flow passages 50 upwardly to nozzle housing outlet 60.

The pressure regulation function is provided as previously discussed except that the pressure acting against the pressure responsive assembly 24 is provided in chamber 55, which is formed as part of the lower housing. In this configuration, however, the manually controlled flow throttling action occurs downstream of the pressure regulating function. Pressure from chamber 55 will flow up passage 51 along connecting rod 22 to the area under pressure responsive assembly 24. Pressure responsive assembly 24 has a low movement friction piston with a lip seal member 53. Thus, in this embodiment the pressure regulation is provided upstream of the flow range control throttling opening 50 by the upward movement of the pressure control throttling member 19 to reduce the flow area 17 into the lower housing 7B.

Figure 15:
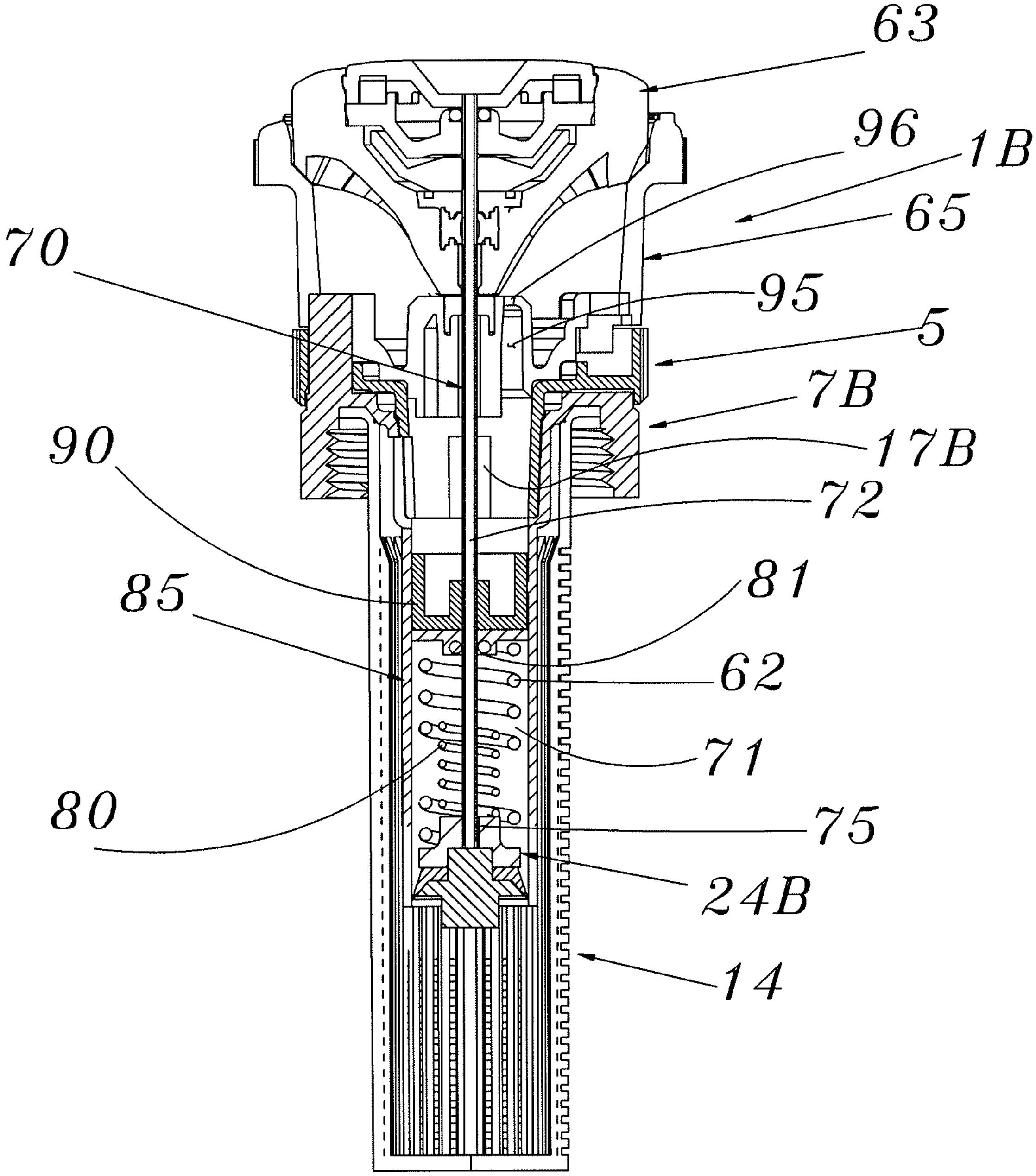
FIG. 15 shows a cross sectional view of a rotary distributor nozzle assembly with a pop-up rotary distributor deflector and with the pressure regulation function moved axially downward into the filter housing portion of the nozzle assembly.

FIG. 15 shows a cross sectional view of a nozzle assembly 1B including a pop-up rotary distributor 63, which is viscous damped. Co-pending U.S. patent application Ser. No. 11/947,571, referenced above, discusses in detail a nozzle assembly with circumferential manual flow control with a rotary pop-up viscous damped distributor on the top of a shaft moving axially through the center clearance hole of the nozzle housing assembly.

The pressure responsive assembly 24B in this configuration has a double function of first sensing inlet water pressure as it is provided through the nozzle assembly filter 14 to move the pressure responsive assembly 24B upwardly against the spring 62. The spring 62 provides a biasing force to bias the rotary distributor 63 down into upper nozzle housing assembly 65 as shown. The pressure of water flowing through the filter 14 will raise the distributor 63 up when it provides sufficient pressure to overcome this biasing force. The rotationally fixed connecting rod 70 from the pressure responsive assembly 24B to viscous damped rotary distributor 63 is axially movable and is formed from a tubular material which may thus provide the atmospheric reference pressure vent to the spring chamber 71 through a vent groove 75 of the assembly 24B and the hollow area 72 of the tubular connecting rod 70.

As the inlet pressure to the nozzle housing assembly moves the pressure responsive assembly 24B upward against the downward retraction force of spring 62, the rotary deflector 63 is raised out of the upper nozzle assembly housing 65 until pressure responsive assembly 24B has pressed the upper end of a second spring 80, which is travelling upwardly with the assembly, against surface 81 at the upper end of the reference pressure chamber 71 and spring housing chamber 85. At this time, upward movement stops unless inlet pressure rises above a level sufficient to compress both spring 62 and spring 80 to move the shaft 70 upward further.

If so, pressure balanced pressure regulating flow throttling valve member 90 begins to be moved in front of the flow inlet ports 17B of lower housing 7B and reduces the available flow area into discharge flow chamber 95 due to high upstream pressure in order to maintain it at the desired level. The flow of water flows out of outlet 96 and strikes the rotating distributor 63 so that the nozzle assembly performance is uniform over a wide range of inlet pressures.

Figure 16:
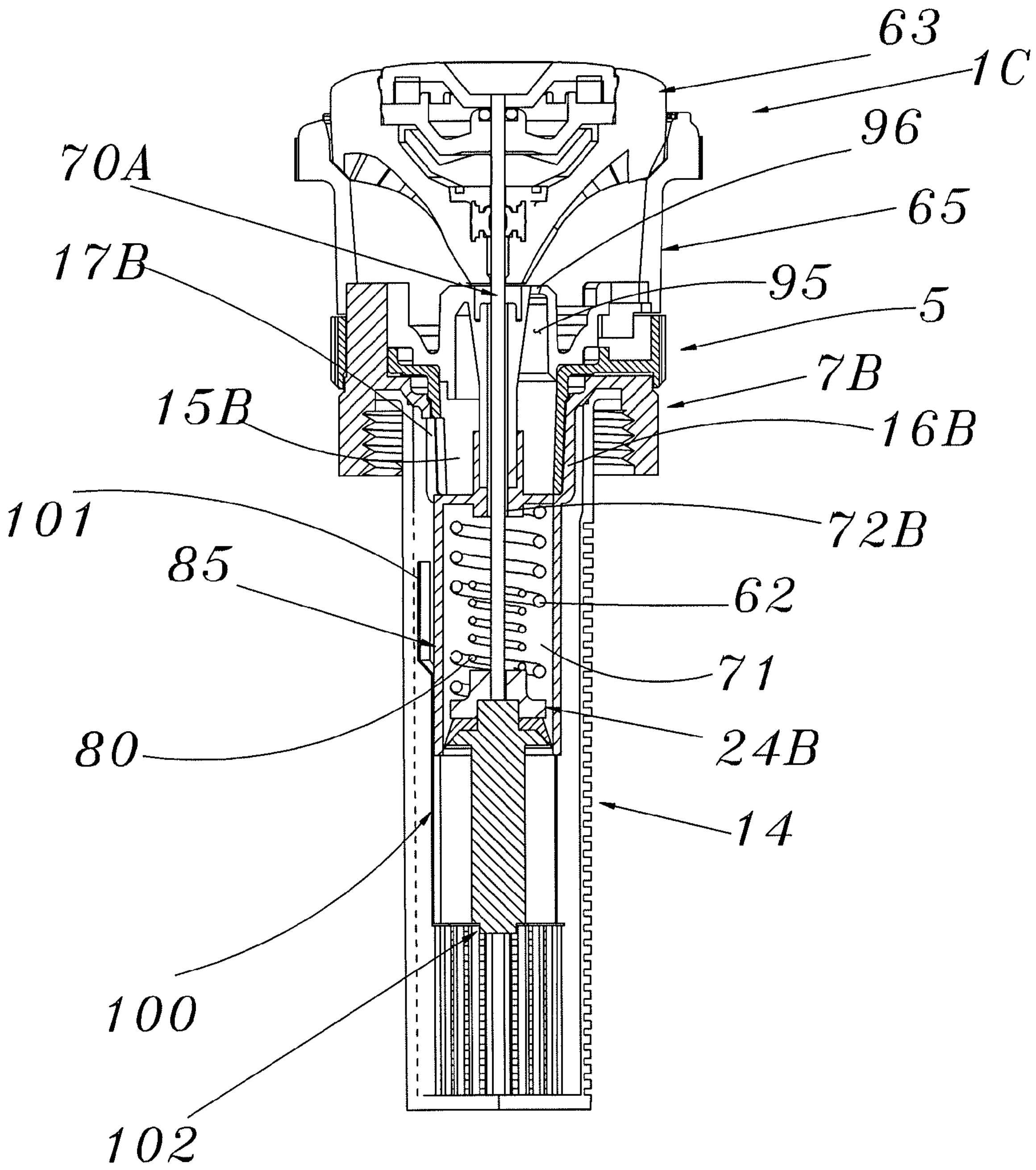
FIG. 16 shows a cross sectional view of a rotary distributor nozzle assembly similar to that of FIG. 15 except that the reference to atmospheric pressure is via an opening surrounding the rotating distributor mounting shaft.
Figure 17:
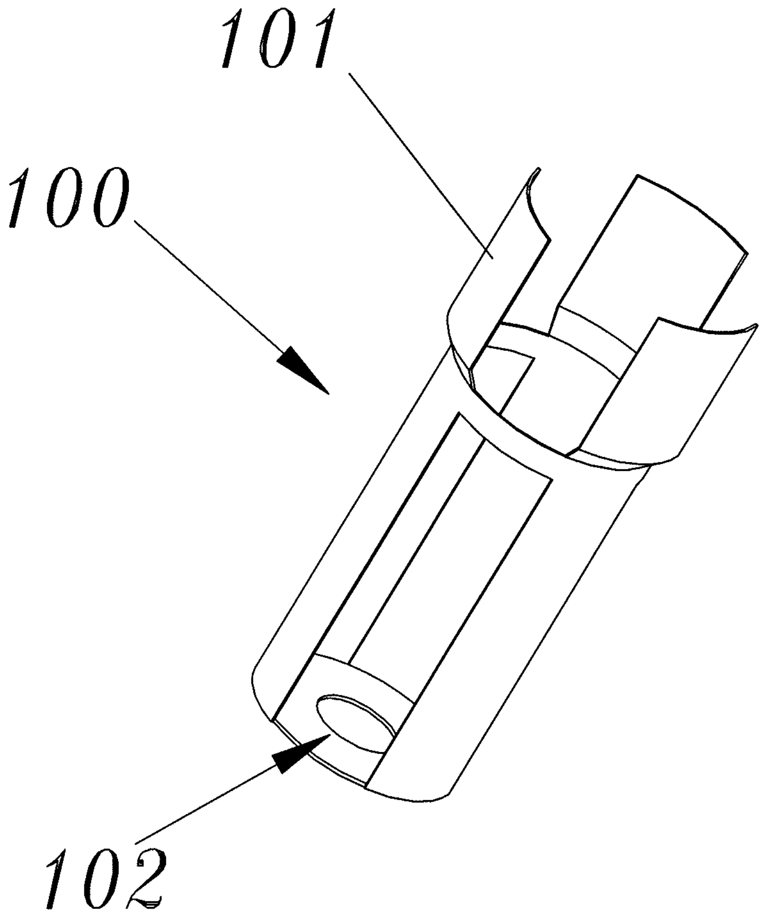
FIG. 17 shows a perspective view of the pressure regulating flow throttling members before being mounted on the upstream end of the activator and pressure responsive piston and shown in FIG. 16.

FIG. 16 shows a cross-sectional view of a rotary distributor nozzle assembly 1C similar to that of FIG. 15 except that the reference to atmospheric pressure is via a shaft clearance hole 72B surrounding the axially translating rotating distributor mounting shaft 70A. The pressure regulating throttling fingers 101 (See also FIG. 17) are moved upwardly when inlet pressure through the filter 14 increases above the pressure necessary to push the pressure responsive piston 24B up further to compress both springs 62 and 80 as previously described with reference to FIG. 15.

In this embodiment, however, the flow throttling to maintain desired pressure in chamber 95 occurs with the throttling fingers 101 covering the opening 17B in the outer lower nozzle housing 7B. These flow throttling fingers 101 shown on the pressure balanced flow throttling valve 100 (see FIG. 17) are connected to an extension member from the pressure responsive assembly 24B. The extension member attaches to throttle valve 100 at its center bottom hole to allow for the axial travel of dual purpose pressure responsive piston 24A which, as described above, first extends the rotating distributor out of its dirt protected position in the nozzle housing assembly and then, after encountering the second spring 80, as described above, is axially positioned based on the pressure regulated valve 100 configuration to place the pressure regulating fingers 101 in a position to restrict the opening into the lower nozzle housing, after they have moved axially upward.

This pressure regulating control is provided upstream of the manually operated flow throttling that may be provided by circumferential flow throttling ring 5 so that any manual range control is pressure regulated for fluctuations of inlet pressure to the nozzle assembly 1C. In FIGS. 15 and 16, the flow control ring 5 is of the same configuration shown in FIG. 6, but with the closure feet 15 that extend downward to close the lower housing opening 17B now labeled 15B. The manually operated flow throttling valve and its new configuration lower house opening 17B functions to allow the feet 15B of the manual throttling ring 5 to reduce the width of flow openings 17B.

Figure 18:
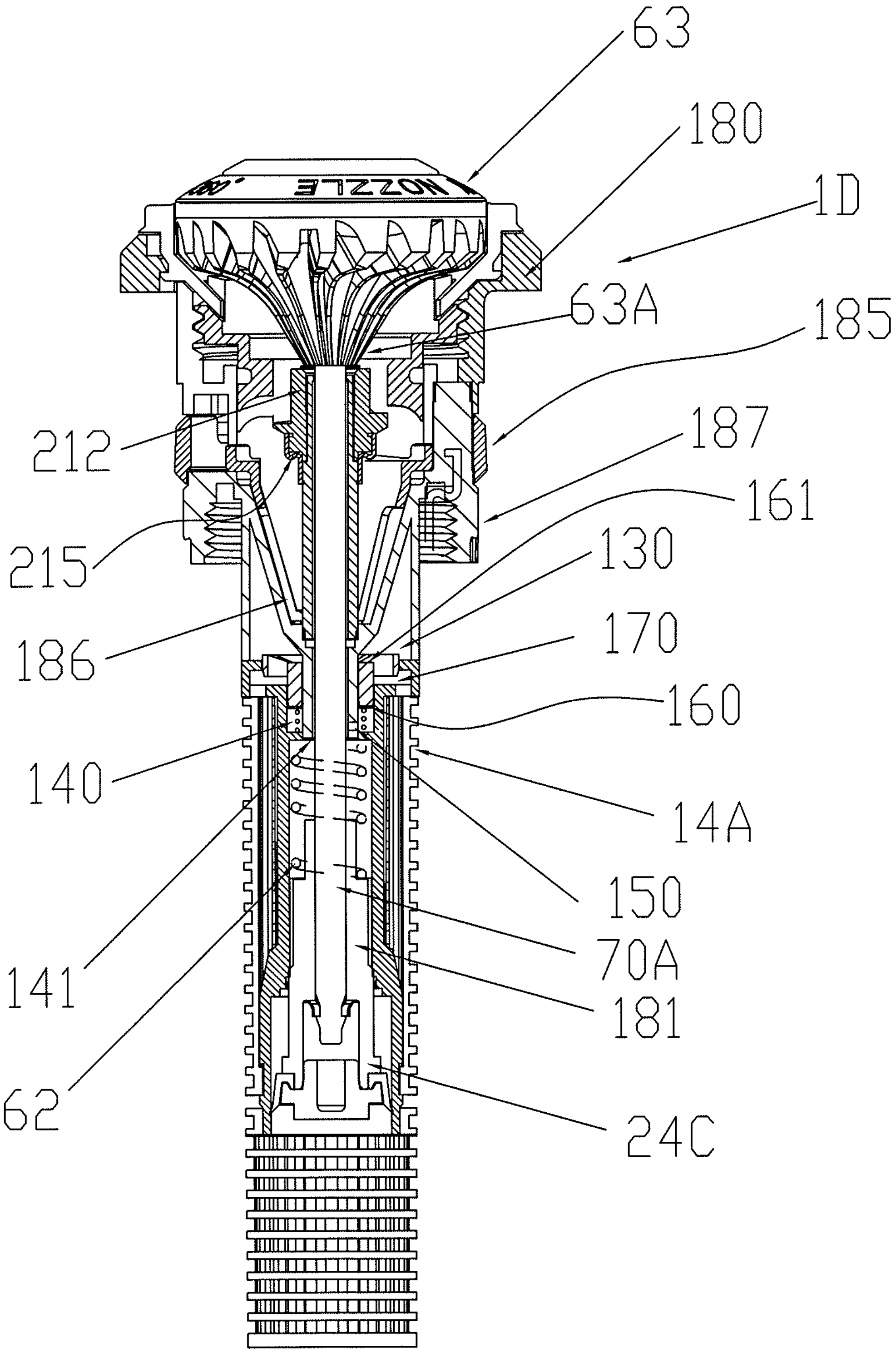
FIG. 18 shows a cross sectional view of a nozzle assembly with a concentrically located pressure regulator ring and a retractable nozzle orifice for self flushing during start up.

FIG. 18 illustrates a cross-sectional view of a rotating distributor nozzle assembly with a separate concentrically located pressure regulator ring and a retractable exit nozzle orifice for self flushing at start-up.

Figure 20:
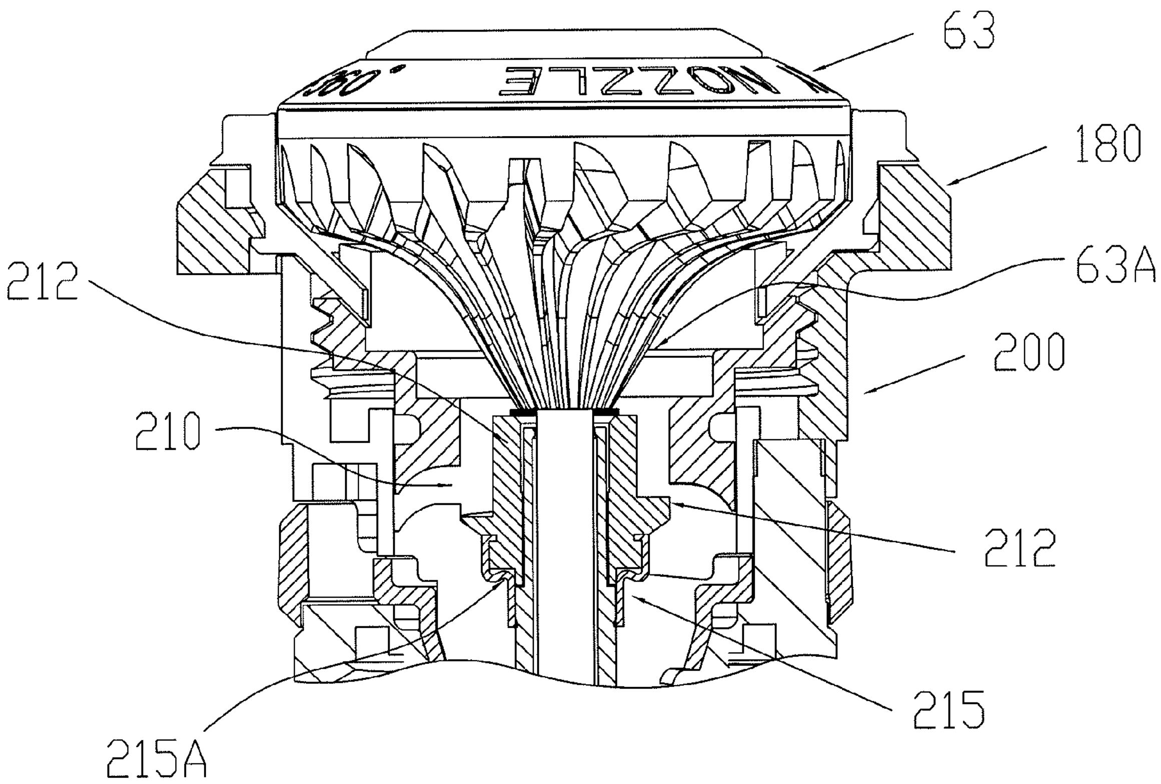
FIG. 20 shows an enlarged cross sectional view of the retractable nozzle orifice for self flushing during start up in the flushing down position of the rotating distribution.
Figure 21:
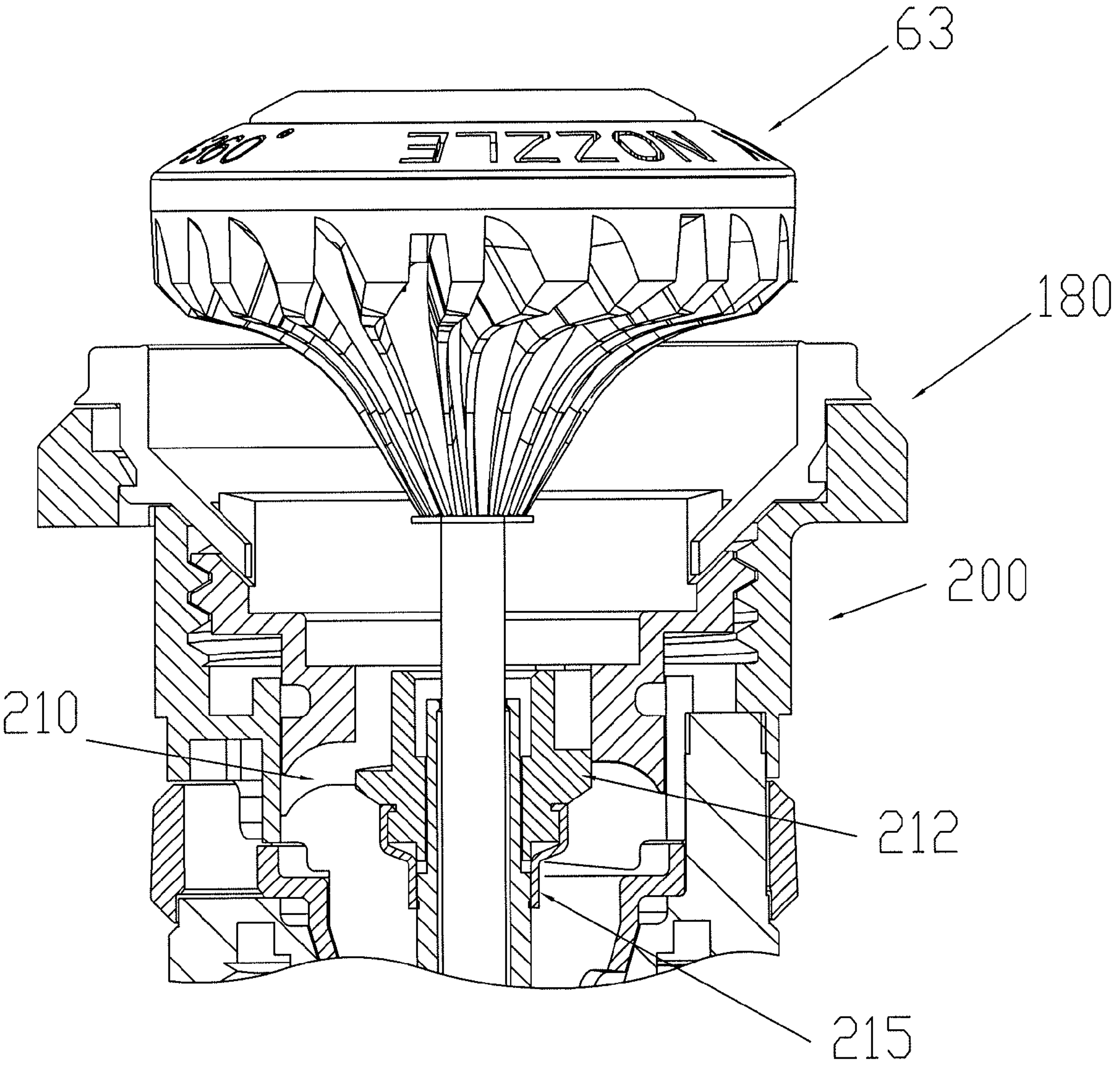
FIG. 21 is the same cross sectional view with the nozzle orifice in the operating, up position.

In FIG. 18, the nozzle assembly 1D is shown in the retracted position with the rotating distributor 63 retracted into the nozzle housing assembly 180 and its bottom, at 63A, pushing the center of the exit nozzle 212 downward against its flexible elastomeric seal 215 to open the flow area of the arc of coverage settable valve at 212 (See FIGS. 20 and 21).

The pressure regulator function has been separated from the rotating nozzle distributor retraction actuation system 181 to be located concentrically around the rotating distributor support and retraction shaft 70A at 160.

Figure 19:
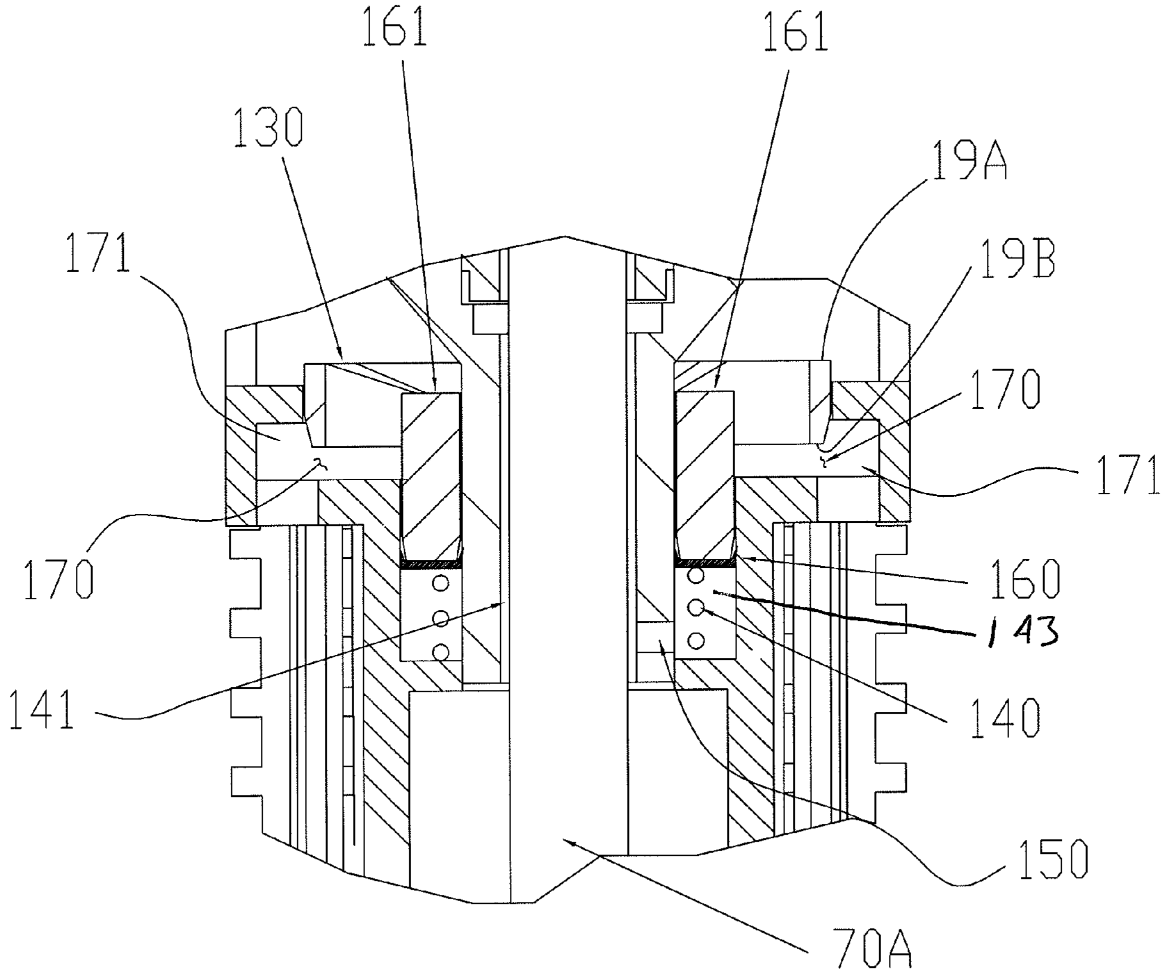
FIG. 19 shows an enlarged view of the concentric pressure regulating ring portion of the nozzle assembly of FIG. 18.

This pressure regulator area of the nozzle assembly is shown enlarged in FIG. 19. The water entering the nozzle assembly through the inlet filter 14A flows upward around the inside circumference of the lower nozzle housing 187 at 170 and enters circumferential inside area 171 of the lower nozzle body where it must flow under the lower flow control edge 19B of the pressure responsive member 130 whose pressure responsive area 161 on its top, high pressure side sees the water pressure inside of the nozzle housing upstream of the manual flow control 185. Throttling windows 186 are provided to allow the range of coverage of individual sprinklers to be separately adjusted manually with each sprinkler's nozzle assembly having the same regulated pressure regardless of its location in the irrigation system. Each nozzle maintains the adjusted range of coverage whenever the system is turned on regardless of change in supply pressure, for example, from municipal water supplies during terms of high demand.

The unique, simple small pressure regulator described herein is possible because of the combination of a low friction lip seal in the pressure responsive member and a throttling element that has a small pressure surface in the axis in which the pressure responsive member moves and in which the throttling member is generally pressure balanced during throttling. In FIG. 19, for example, the donut shaped low friction seal 160 is provided with sealing lips rubbing the inside and outside walls of the reference chamber at 143, which chamber also houses the pressure setting biasing spring 140. The atmospheric reference pressure is provided to this area via a unique arrangement in which the center rotating distributor support shaft clearance hole 141, which now supplies the reference pressure for the chamber 140, through hole 150 and also provides the atmospheric pressure reference for the distributor pop-up actuator 181 which is moved by its separate lip seal actuator piston 24C.

In operation, the small concentric ring pressure regulator and an outside ring throttling element which is thin walled with a small downstream element 19A and upstream pressure axial acting pressure area 19B to oppose action of the pressure responsive pressure area 161 acting against its reference pressure area and bias of spring 140. That is, the axial facing areas 19A and 19B of the element 130 are relatively small such that they do not affect operation of the pressure regulating elements.

The flow throttling force is directed substantially normal to the throttle element 19 of the pressure response member 130 and the axially operating forces for moving the throttling member to establish a desired pressure in the nozzle housing. This concept allows the flow throttling area pressure dynamics to provide a reduced, or negligible, effect on the pressure control function of the pressure responsive piston area acting against its bias spring which is pre-loaded to keep the flow throttling area full open until the pressure inside the nozzle housing exceeds the pressure area load of the biasing spring. At this time, the added pressure begins to move the throttling member element into the flow path generally normal to the direction of flow through the throttling area to minimize its effect on the actuator pressure control.

FIG. 20 shows an enlarged view of the exit nozzle area of the nozzle assembly 200 of FIG. 18. The center nozzle member 212 is shown pushed down by the bottom of the rotating distributor at 63A against the upward force of elastomeric seal 215 as in the folds at 215A.

In this position, the exit flow area 210 has been forced open as can be seen when comparing the exit nozzle area shown in the operating position of FIG. 21. As can be seen in FIG. 21, the nozzle center 212 moves axially upward once the rotating distributor shown at 180 has been extended during pressurized operation. The elastomeric form of the diaphragm like seal 215 and the internal nozzle housing pressure has moved the nozzle up into its operating position which is shown only partially circumferentially open for a partial arc of operation of an adjustable arc nozzle.

FIG. 21 is the same cross-sectional view with the nozzle orifice in the operating, up position.

Figure 22:
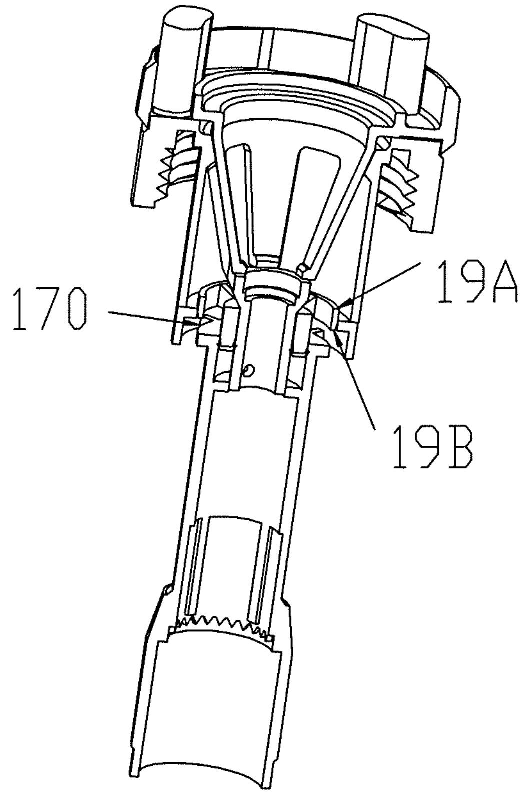
FIG. 22 shows a perspective cross sectional view of a portion of the nozzle housing with a portion of the concentric pressure regulating ring shown in the full open position.

FIG. 22 shows a perspective cross sectional view of a portion of the nozzle housing with a portion of the concentric pressure regulating ring shown in the full open position.

Figure 23:
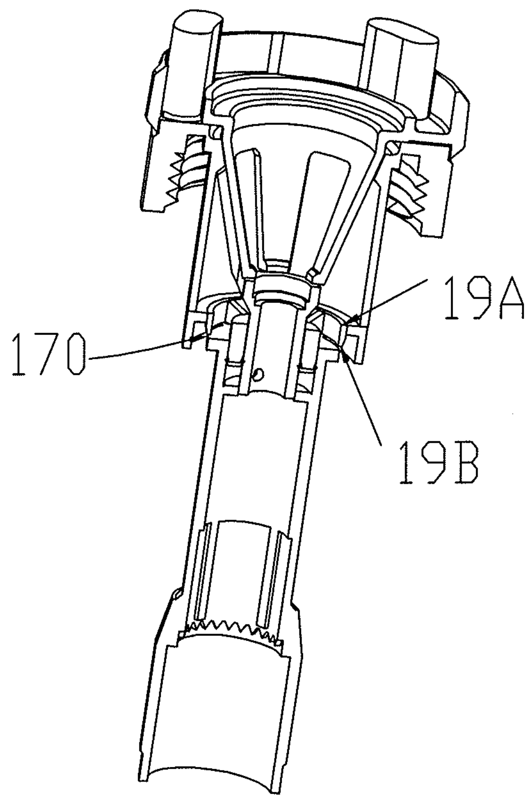
FIG. 23 shows a perspective cross sectional view of a portion of the nozzle housing with a portion of the concentric pressure regulating ring shown in the closed position.

FIG. 23 shows a perspective cross sectional view of a portion of the nozzle housing with a portion of the concentric pressure regulating ring shown in the closed position.

Although the present invention has been described in relation to particular embodiments thereof, many other variations and modifications and other uses will become apparent to those skilled in the art.

What is claimed is:

1. A sprinkler nozzle assembly comprising;

a lower housing configured for attachment to a sprinkler assembly;

an upper housing mountable on the lower housing and including an outlet nozzle;

a flow control ring positioned between the lower housing and the upper housing, the flow control ring movable relative to the upper and lower housing to control a flow of water through the sprinkler nozzle assembly;

a distributor movably mounted on the sprinkler nozzle assembly and configured to deflect water from the outlet nozzle of the sprinkler nozzle assembly; and a pressure regulating with throttling valve mechanism positioned at an inlet of the sprinkler nozzle assembly configured to maintain a desired pressure in the sprinkler nozzle assembly.

2. The sprinkler nozzle assembly of claim 1, further comprising a filter positioned below the lower housing configured to filter water entering the sprinkler nozzle assembly.

3. The sprinkler nozzle assembly of claim 1, wherein the lower housing further comprises a plurality of legs extending downward with a plurality of openings provided between the legs to allow water into the sprinkler nozzle assembly.

4. The sprinkler nozzle assembly of claim 3, wherein the flow control ring further comprises a plurality of feet extending downward behind the legs of the lower housing, wherein the flow control ring is rotatable such that the feet selectively block the openings between the legs of the lower housing to control the flow of water into the lower housing.

5. The sprinkler nozzle assembly of claim 4, wherein the pressure regulating and throttling mechanism further comprises:

a reference pressure chamber configured to maintain a reference pressure;

a pressure regulating piston movably mounted in the reference pressure chamber;

a connecting rod connected to the pressure regulating piston and extending through the flow control ring and into the lower housing;

a valve element connected to a bottom end of the connecting rod and movable with the pressure regulating piston to control a flow of water into the sprinkler nozzle assembly, the valve element configured such that movement of the valve element is substantially normal to a flow of water through the openings between the legs of the lower housing.

6. The sprinkler nozzle assembly of claim 5, wherein the reference pressure chamber further comprises an opening formed in a wall thereof to expose the reference chamber to atmospheric pressure and wherein atmospheric pressure is the reference pressure.

7. The sprinkler nozzle assembly of claim 6, wherein a top of the pressure regulating piston is exposed to the reference pressure and a bottom of the pressure regulating piston is exposed to a pressure upstream of the outlet nozzle and distributor.

8. A nozzle assembly comprising;

a lower housing configured for attachment to a sprinkler assembly;

an upper housing mountable on the lower housing and including an outlet nozzle;

a flow control ring positioned between the lower housing and the upper housing, the flow control ring movable to control a flow of water through the nozzle assembly;

a distributor rotatably mounted on a support shaft that is mounted in the nozzle assembly for axial movement in the nozzle assembly, the distributor configured to deflect water away from the nozzle assembly; and a pressure regulating and throttling mechanism positioned in the lower housing and configured to maintain a desired pressure in the lower housing.

9. The nozzle assembly of claim 8, wherein the pressure regulating and throttling mechanism moves axially with the support shaft.

10. The nozzle assembly of claim 9, wherein the lower housing includes a plurality of legs extending downward with a plurality of openings provided between the legs to allow water into the lower housing.

11. The nozzle assembly of claim 10, wherein the pressure regulating and throttling mechanism further comprises a valve element including fingers extending upwards therefrom and aligned with the plurality of openings of the lower housing such that when sufficient pressure is applied at an inlet of the nozzle assembly, the fingers of the valve element move up to block the openings and reduce water flow into the lower housing to maintain the desired pressure therein.

12. The nozzle assembly of claim 11, wherein the pressure regulating and throttling mechanism includes a first biasing element configured to bias the distributor in a down position.

13. The nozzle assembly of claim 12, wherein the pressure regulating and throttling mechanism includes a second biasing member configured to control axial movement of the pressure regulating and throttling mechanism upward to maintain the desired pressure in the lower housing.

14. A nozzle assembly comprising;

a lower housing configured for attachment to a sprinkler assembly;

an upper housing mountable on the lower housing and including an outlet nozzle;

a flow control ring positioned between the lower housing and the upper housing, the flow control ring movable to control a flow of water through the nozzle assembly;

a distributor rotatably mounted on a support shaft that is mounted in the nozzle assembly for axial movement in the nozzle assembly, the distributor configured to deflect water away from the nozzle assembly;

a filter positioned below the lower housing configured to filter water entering the nozzle assembly; and a pressure regulating and throttling mechanism positioned in the lower housing and configured to maintain a desired pressure in the lower housing.

15. The nozzle assembly of claim 14, wherein the pressure regulating and throttling mechanism is positioned downstream of the filter in the lower housing and concentrically around the support shaft.

16. The nozzle assembly of claim 15, wherein the pressure regulating and throttling mechanism includes a valve element mounted in the lower housing for axial movement based on a pressure differential between a reference pressure and a pressure in the lower housing to maintain a desired pressure in the lower housing.

17. The nozzle assembly of claim 16, wherein the valve element is configured such that it moves in a direction substantially normal to a flow of water from the filter into the lower housing.

18. The nozzle assembly of claim 17, wherein a bottom side and a top side of the valve element are substantially pressure regulated.

19. The nozzle assembly of claim 18, wherein the pressure regulating and throttling mechanism includes a biasing element configured to bias the valve element is a desired position corresponding to the desired pressure in the lower housing based on a difference between atmospheric pressure and a pressure in the lower housing.

20. A nozzle assembly comprising;

a lower housing configured for attachment to a sprinkler assembly;

an upper housing mountable on the lower housing and including an outlet nozzle;

a flow control ring positioned between the lower housing and the upper housing, the flow control ring movable relative to the upper and lower housing to control a flow of water through the nozzle assembly;

a distributor mounted on the nozzle assembly and configured to deflect water from the outlet nozzle of the nozzle assembly; and a pressure regulating throttling valve mechanism positioned at an inlet of the nozzle assembly and configured to maintain a desired pressure in the nozzle assembly.

21. A sprinkler nozzle assembly with a nozzle housing, the nozzle housing comprising;

a cylindrical reference pressure chamber;

a pressure responsive piston mounted in the cylindrical reference pressure chamber;

a bias element, the bias element configured and positioned in the cylindrical reference pressure chamber to bias the pressure responsive piston in a first direction, and a movable valving member axially connected to the pressure responsive piston and movable with the pressure responsive piston such that the movable valving member controls flow of water into the nozzle housing where water pressure acts on the pressure responsive piston to apply force in a second direction, opposite the first direction and into the cylindrical reference pressure chamber, and against the bias element such that a desired pressure is maintained in the nozzle housing.

22. The sprinkler nozzle assembly of claim 21 further comprising a fixed spray deflector positioned on a top of the nozzle housing.

23. The sprinkler nozzle assembly of claim 21 further comprising a full circle spray deflector positioned on a top of the nozzle housing.

24. The sprinkler nozzle assembly of claim 21 further comprising a flow bubbler discharge nozzle positioned on a top of the nozzle housing.

* * * * *